United States Patent
Jaehnke et al.

(10) Patent No.: US 12,516,563 B2
(45) Date of Patent: Jan. 6, 2026

(54) DRIVE DEVICE FOR PIVOTING A LEAF, HINGED DOOR OR CASEMENT WINDOW ASSEMBLY, AND USE OF THE DRIVE DEVICE FOR A HINGED DOOR OR CASEMENT WINDOW DRIVE

(71) Applicant: dormakaba Deutschland GmbH, Ennepetal (DE)

(72) Inventors: Jan-Hendrik Jaehnke, Ennepetal (DE); Konstantin Lygin, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 0 days.

(21) Appl. No.: 18/027,729

(22) PCT Filed: Sep. 24, 2021

(86) PCT No.: PCT/EP2021/076315
§ 371 (c)(1),
(2) Date: Mar. 22, 2023

(87) PCT Pub. No.: WO2022/063958
PCT Pub. Date: Mar. 31, 2022

(65) Prior Publication Data
US 2023/0383586 A1    Nov. 30, 2023

(30) Foreign Application Priority Data
Sep. 25, 2020   (DE) .......................... 102020125101.7

(51) Int. Cl.
E05F 15/63     (2015.01)
E05F 1/10      (2006.01)
H02K 7/116     (2006.01)

(52) U.S. Cl.
CPC .............. *E05F 15/63* (2015.01); *E05F 1/105* (2013.01); *H02K 7/116* (2013.01);
(Continued)

(58) Field of Classification Search
CPC ..... E05F 2015/631; E05F 1/105; H02K 7/116
See application file for complete search history.

(56) References Cited

U.S. PATENT DOCUMENTS 4,727,679 A    3/1988   Kornbrekke et al.
7,816,879 B2 * 10/2010  Taheri ................... E05F 15/635
                                                    318/266

(Continued)

FOREIGN PATENT DOCUMENTS

DE    102015112685 B3 *  8/2015
EP        3064694 A1     9/2016

OTHER PUBLICATIONS

English translation of DE102015112685B3 from WIPO (Year: 2015).*

(Continued)

*Primary Examiner* — Jonathan Liu
*Assistant Examiner* — Susan M. Heschel
(74) *Attorney, Agent, or Firm* — CANTOR COLBURN LLP (57) ABSTRACT

A drive device for pivoting a leaf, in particular a door leaf or window leaf, about a leaf axis, the drive device having a motor-transmission module, the motor-transmission module including an electric machine having a machine axis as well as a transmission having an output shaft that is mounted to be rotatable about an output axis. The electric machine is at least partially, in particular entirely, arranged in a mounting space between the leaf axis and the output axis.

13 Claims, 7 Drawing Sheets

(52) U.S. Cl.
CPC ... *E05F 2015/631* (2015.01); *E05Y 2201/438* (2013.01); *E05Y 2201/442* (2013.01); *E05Y 2201/638* (2013.01); *E05Y 2201/716* (2013.01); *E05Y 2800/26* (2013.01); *E05Y 2900/132* (2013.01); *E05Y 2900/148* (2013.01)

(56) References Cited

U.S. PATENT DOCUMENTS

| | | | | |
|---|---|---|---|---|
| 8,292,770 | B2 * | 10/2012 | Novikov | H02K 7/116 |
| | | | | 475/5 |
| 10,077,591 | B2 * | 9/2018 | Hass | E05F 15/63 |
| 10,731,392 | B2 * | 8/2020 | Salice | E05D 15/40 |
| 11,414,911 | B2 * | 8/2022 | Romero | E05F 15/53 |
| 11,802,433 | B2 * | 10/2023 | Aceto | F16H 35/02 |
| 2006/0087429 | A1 | 4/2006 | Snell et al. | |
| 2009/0206777 | A1 | 8/2009 | Taheri et al. | |

OTHER PUBLICATIONS

Translated International Search Report for International Application No. PCT/EP2021/076315, International Filing Date Sep. 24, 2021, Date of Mailing Dec. 23, 2021, 3 pages.

* cited by examiner

DRIVE DEVICE FOR PIVOTING A LEAF, HINGED DOOR OR CASEMENT WINDOW ASSEMBLY, AND USE OF THE DRIVE DEVICE FOR A HINGED DOOR OR CASEMENT WINDOW DRIVE

CROSS-REFERENCE TO RELATED APPLICATIONS

This application is a 35 U.S.C. § 371 National Stage patent application of PCT/EP2021/076315, filed on 24 Sep. 2021, which claims the benefit of German patent application 102020125101.7, filed on 25 Sep. 2020, the disclosures of which are incorporated herein by reference in their entirety.

TECHNICAL FIELD

The disclosure relates to a drive device for pivoting a leaf about a leaf axis, in particular a door leaf or a window leaf, having the features of the preamble of the claims. However, the disclosure also relates to a swing leaf arrangement having the features of the preamble of the claims and a use of the drive device.

BACKGROUND

Drive devices can be used to move a leaf, with a leaf being understood in particular to mean a door or window leaf. The movable part of a door is referred to as a door leaf, for which the term door panel is also common.

Such drive devices are known. Such drive devices are typically provided directly on the leaf to be moved or on a door frame or a window frame. The installation space available is very limited, in particular when assembling on the door frame or the window frame. The disadvantage of known drive devices is that they are relatively complex in design. It is also disadvantageous that, in combination with a gear, unfavorable transmission ratios result from the machine to the output shaft.

SUMMARY

Against this background, the disclosure enables a compact and particularly uncomplicated configuration of a drive device which, in combination with a gear, enables favorable transmission ratios.

This is achieved by providing a drive device and by a swing leaf arrangement having the features of the claims. Advantageous further developments are indicated in the dependent claims, the description and in the figures. Features and details that are described in connection with the drive device according to the disclosure also apply in connection with the swing leaf arrangement according to the disclosure and with the method according to the disclosure and/or the use according to the disclosure and vice versa. In this case, the features mentioned in the description and in the claims may each be essential to the disclosure individually by themselves or in combination. The description additionally characterizes and specifies the disclosure, in particular in connection with the figures.

A drive device for pivoting a leaf about a leaf axis, in particular a door leaf or a window leaf, is particularly preferably indicated. The drive device has a motor-gear module, with the motor-gear module having an electric machine with a machine axis and a gear with an output shaft that is mounted so as to be rotatable about an output axis. The electric machine is at least partially, in particular completely, arranged in an installation space between the leaf axis and the output axis.

Alternatively or cumulatively, the electric machine can be arranged between an, in particular virtually extended, secondary closing edge of the leaf and the output axis.

The electric machine can be designed as a motor and/or generator. As a motor, the electric machine can generate a rotational movement, in particular a torque, from electrical energy. As a generator, the electric machine can generate electrical energy from a rotational movement, in particular from a torque.

The machine axis means the axis of rotation about which a rotor of the electric motor rotates.

In particular, the leaf can have the secondary closing edge facing the leaf axis and a main closing edge opposite the secondary closing edge, with the main closing edge usually facing the door handle.

As a result, the electric machine is closer to the leaf axis than the output shaft such that, in combination with a gear, this results in favorable transmission ratios from the machine to the output shaft. Furthermore, such a drive device can be brought into operative connection in a simple manner with a mechanical energy storage device of a closer module, since due to the machine position, the output shaft faces the main closing edge of the leaf, in particular with favorable transmission ratios from a closer module to the output shaft being achievable. Such a design also enables installation space to be saved since a control device can be attached closer to the electric machine.

The term axes, in particular as in the case of leaf axis, output axis, machine axis, axis of rotation, means virtual axes which are fundamentally not limited in their extent.

In particular, the leaf axis and/or the output axis can have a substantially vertical profile, in particular with the vertical component of the profile being 90 to 100, in particular 95 percent.

It may be preferred that the gear is at least partially arranged in an installation space between the output axis and the machine axis.

In particular, the gear can be arranged at least partially, in particular completely, in the installation space between the output axis and the machine axis, in particular a virtual extension of the machine axis. In particular, the electric machine can be arranged at least partially, in particular completely, in an installation space between a leaf axis and the output axis. Alternatively or cumulatively, the electric machine can be arranged between an, in particular virtually extended, secondary closing edge of the leaf and the output axis.

In this way, the desired torque and/or the desired speed can be transmitted from the electric machine to the output shaft via the gear in a simple and/or space-saving manner.

The installation space has a width, a height and a depth, with the width being limited by a distance between the leaf axis and the output shaft or the gear. In particular, the height and/or the depth of the installation space can be limited by a motor-gear housing or by the gear or by the electric machine.

It may be preferred that the motor-gear module comprises the motor-gear housing with a first side wall facing the leaf axis and a second side wall facing away from the leaf axis. In particular, the electric machine can be arranged at least partially, preferably completely, in an installation space between the first side wall and the output axis.

In particular, the electric machine and/or the gear can be arranged at least partially, in particular completely, within the motor-gear housing. This does not include connecting cables to and from the electric machine.

The wording—within the housing—means that the elements are arranged at least partially, in particular completely, in the space formed by the housing.

It may be preferred that the machine axis and the output axis run parallel, preferably lying on a virtual plane. Alternatively or cumulatively to the output axis, one or a plurality of, in particular all, axes of rotation of the respective gear elements can also run parallel to the machine axis, preferably on the same virtual plane. Such an arrangement enables a reduction in friction losses.

It may be preferred that the output shaft is connected in a rotationally-fixed manner to a lever to form a connection of the drive device to the leaf or to a frame. It may be preferred that the lever is designed in such manner that a voltage supply of the electric machine and/or at least one control signal for the electric machine can be transmitted via the lever to the motor-gear module, in particular to the electric machine.

The term frame also includes a door frame or window frame.

It may be preferred that the gear is designed as a toothed gear, preferably as an, in particular, multi-stage spur gear and/or as a planetary gear or as an eccentric gear.

In particular, the electric machine can comprise one, in particular a single, stator and one, in particular a single, rotor which can be rotated about the machine axis, and can have the gear coupled to the electric machine. In particular, the gear can have a first gear element that can be rotated coaxially with the machine axis. In particular, the first gear element can be connected to the rotor in a rotationally-fixed manner.

This configuration is advantageous in terms of saving installation space in the radial direction of the electric machine.

In particular, the gear can have a second gear element, which is operatively connected to the first gear element and that an axis of rotation of the second gear element runs in an installation space between the machine axis and an outer lateral surface of the rotor that is extended virtually in the axial direction of the machine or an outer lateral surface of the stator that is extended virtually in the axial direction of the machine, in particular parallel to the machine axis.

This configuration is advantageous in terms of a further saving in installation space in the radial direction of the electric machine.

In particular, the first gear element can be arranged entirely in an installation space, with the installation space being delimited by an outer lateral surface of the rotor that is extended virtually in the axial direction of the machine.

In particular, the first and the second gear element or the entire gear can be arranged entirely in one installation space, with the installation space being delimited by an outer lateral surface of the rotor that is extended virtually in the axial direction of the machine or by an outer lateral surface of the stator that is extended virtually in the axial direction of the machine.

As a planetary gear, the gear can have a sun gear that is rotationally-fixed with the rotor, in particular in one piece therewith, a plurality of planetary gears fastened about the sun gear on a planetary carrier, and a ring gear that is engaged with the planets. In this case, the ring gear can be rotatably mounted and form the power output of the planetary gear, with the planetary carrier being designed to be stationary. Alternatively, the planetary carrier can be rotatably mounted and form the power output of the planetary gear, with the ring gear being designed to be stationary. The terms planet and planetary wheel are used synonymously.

As a planetary gear, the gear can also have at least one Wolfrom stage. In a preferred embodiment of such a Wolfrom stage, the planetary gear has a first gear stage and a second gear stage, with the first gear stage comprising a sun gear, a plurality of first planets fastened to a planetary carrier and driven by the sun gear, and a first stationary ring gear, and the second gear stage comprising a second rotatable ring gear, second planets which are rotationally-fixed with the first planets, in particular in one piece therewith, with the second planets driving the second ring gear. In particular, the second ring gear can form the power output of the planetary gear.

In particular, the gear can be designed as a combination of planetary gear and spur gear. The ring gear of the planetary gear can have external teeth and act as a spur gear, in particular with the ring gear being engaged with a closer wheel of the closer module and/or an interface element and/or with the ring gear forming the interface element.

As an eccentric gear, the gear can be designed as a planetary eccentric gear and/or strain wave gear.

It may be preferred that the electric machine is designed as an axial flux machine with the, in particular single, stator and the, in particular single, rotor In the axial flux machine, the magnetic flux is mainly formed parallel to the machine axis of the electric machine. The axial flux machine has a small overall axial length compared to other machine types. The axial overall length means an overall length in a direction parallel to the machine axis. The use of an axial flux machine therefore enables the dimensions of the electric machine to be reduced in the axial direction. This allows a compact configuration of the motor-gear module. In particular, the axial flux machine can be a brushless direct current machine, in particular a so-called BLDC machine. Such a machine is designed like a three-phase synchronous machine with excitation by permanent magnets.

The axial flux machine can be designed as a motor and/or generator. As a motor, the axial flux machine can generate a rotational movement, in particular a torque, from electrical energy. As a generator, the axial flux machine can generate electrical energy from a rotational movement, in particular from a torque.

In particular, the stator can have one or a plurality of coils, preferably 7 to 16, particularly preferably 10 to 14 coils, with it being possible to arrange the coil or coils of the stator in such manner that a magnetic flux can be generated through the coil or coils in a direction parallel to the machine axis.

The term coil means an electrical conductor with at least one winding. The electrical conductor can be designed as a wire and/or strip, in particular insulated by means of a coating, preferably by means of an insulating varnish. For this purpose, the conductor can have an insulating coating, in particular an insulating varnish. In particular, the coil can be designed as a cast coil, with individual windings of the coil being electrically insulated from one another by means of a cast material.

In particular, the rotor can comprise at least one permanent magnet, with the permanent magnet being arranged along a virtual circle around the machine axis and spanning a first angular range. The stator can comprise the stator base with at least one stator tooth protruding from the stator base, in particular in the axial direction of the axial flux machine, with the stator tooth being arranged along a virtual circle around the machine axis and spanning a second angular range. The ratio of the first angular range as a dividend to the second angular range is in the range from 1.1 to 1.6, preferably in the range from 1.2 to 1.5, particularly preferably in the range from 1.3 to 1.4. If there are a plurality of teeth and/or magnets, each tooth can have the above-mentioned ratio to each magnet. Alternatively or cumulatively, in the case of a plurality of magnets and teeth, a summed range, i.e. a ratio, can be in a range from 1.3 to 1.9 or even from 1.5 to 1.8.

For the purposes of the disclosure, the term circle around the machine axis means that the machine axis forms the center point of the circle.

In particular, a surface of the stator tooth, in particular of each stator tooth, running parallel to the stator base can be designed in such manner that the surface widens in the radial direction of the stator, starting from the machine axis. Alternatively or cumulatively, a surface of the permanent magnet, in particular of each permanent magnet, running parallel to the stator base can be designed in such manner that the surface widens in the radial direction of the rotor, starting from the machine axis. In this way, the specified ratio of the first angular range as a dividend to the second angular range can be kept constant along the radial profile of the stator. In particular, the surface of the stator tooth, in particular of each stator tooth, running parallel to the stator base can remain constant along the axial profile of the stator tooth.

In particular, a coil can be wound directly or indirectly around at least one of the stator teeth, in particular around each stator tooth. In particular, the stator teeth can protrude from a common surface of the stator base.

In particular, the stator base can be connected to at least one, in particular each, stator tooth in a form-fitting and/or force-fitting and/or materially-bonded manner or can be formed in one piece therewith.

In particular, at least one tooth can have a tooth cover, with it being possible for the coil to be arranged around the tooth cover. In particular, the tooth cover can be electrically insulating, preferably comprising at least partially of a plastic, particularly preferably be designed as an injection-molded component.

In particular, the ratio between the number of permanent magnets as a dividend and the number of coils can be in a range from 1.0 to 1.6, preferably in a range from 1.2 to 1.4, particularly preferably can be 4:3, in particular 1.1, in particular 7:6.

In particular, at least one, in particular each, permanent magnet can be designed in the form of a plate. In particular, the rotor can have a rotor plate, in particular a rotor disc. Furthermore, at least one, in particular each, permanent magnet can protrude from the rotor plate of the rotor in the axial direction of the machine, in particular in the direction of the stator. In particular, the rotor plate can have one or a plurality of indentations, in particular a number of indentations corresponding to the number of permanent magnets, with a permanent magnet lying in each indentation. In particular, the shape of the indentation, in particular of each indentation, can correspond to the shape of the inlaid permanent magnet. This serves to secure the permanent magnets on the rotor, in particular on the rotor plate.

In particular, the electric machine, in particular as a motor, can have a ratio of the maximum torque to the axial extent of the machine that is greater than 30 Nm/m, preferably greater than 100 Nm/m, particularly preferably greater than 200 Nm/m. The axial extent is parallel to the machine axis. In particular, this ratio can be greater than 50 Nm/m, preferably greater than 70 Nm/m, particularly preferably greater than 150 Nm/m. In particular, the electric machine can have a torque density, i.e. torque to motor volume, of greater than or equal to 6000 Nm/m$^3$, preferably greater than or equal to 15000 Nm/m$^3$ and particularly preferably greater than or equal to 20000 Nm/m$^3$ and/or a torque constant of greater than or equal to 0.1 Nm/A, preferably greater than or equal to 0.2 Nm/A and particularly preferably greater than or equal to 0.3 Nm/A. This configuration enables a compact design of the gear and small transmission ratios, while still enabling the door to be closed reliably. In this way, the drive device can also be of compact construction overall.

In particular, the electric machine configured as an axial flux machine can have a ratio between the extent of at least one stator tooth in the axial direction of the electric machine as a dividend and the extent of the stator base in the axial direction of the electric machine, with the ratio being greater than or equal to 2, in particular greater than or equal to 3, in particular greater than or equal to 4, in particular greater than or equal to 5, in particular greater than or equal to 6.

It may be preferred that the electric machine comprises the stator with an, in particular plate-shaped, stator base, and has a plurality of stator teeth protruding from the stator base, in particular in the axial direction of the machine.

In particular, the stator teeth can protrude from a common surface of the stator base. In particular, the stator base can be connected to at least one, in particular each, stator tooth in a form-fitting and/or force-fitting and/or materially-bonded manner or can be formed in one piece therewith.

In particular, the stator base can have a bearing mount for receiving a bearing, in particular a roller bearing or a slide bearing. In particular, the bearing mount can be arranged on a stationary bolt which is connected to the stator in a form-fitting and/or force-fitting and/or materially-bonded manner or is formed in one piece therewith.

In particular, the bearing mount can have an, in particular annular, bearing support surface, which is connected to the stator base in a form-fitting and/or force-fitting and/or materially-bonded manner or is formed in one piece therewith.

The bearing support surface designates a surface on or against which the bearing can rest.

In particular, the bearing mount can be cylindrical, in particular hollow-cylindrical.

In particular, the stator can have a stationary bolt, with the bolt being connected to the stator in a form-fitting and/or force-fitting and/or materially-bonded manner or being formed in one piece therewith and comprising the bearing mount.

It may be preferred that the drive device has a closer module with a mechanical energy storage device.

In particular, the mechanical energy storage device can comprise one or a plurality of compression springs and/or tension springs, which are connected via a linkage carriage to a transmission element for translating the linear movement of the energy storage device into a rotational movement of the transmission element.

In particular when used on fire protection leaves, the drive device can have the closer module. In the event of a fire, the closer module thus ensures that the fire protection leaf closes, in particular without manual actuation and without current.

It may be preferred that the drive device comprises the closer module with the mechanical energy storage device and a transmission element for translating a linear movement of the energy storage device into a rotational movement of the transmission element. In particular, the transmission element can be designed as a cam disc.

Depending on the requirements, the cam disc can be designed symmetrically or asymmetrically. Furthermore, the cam disc can be designed as a stroke-producing cam disc, in particular heart-shaped.

In particular, the closer module can comprise a closer wheel, in particular a closer gear wheel, with the closer wheel being arranged coaxially, preferably in a rotationally-fixed manner, with respect to the transmission element. In particular, the transmission element and the closer wheel can be connected in a form-fitting and/or force-fitting and/or materially-bonded manner, particularly preferably designed in one piece.

In particular, the closer module can have a fixed axle body, with the transmission element and the closer wheel being rotatably mounted on the axle body. In particular, the closer module can be arranged in a closer housing.

In particular, the closer module can be arranged at least partially, in particular completely, in an installation space between the motor-gear module and the main closing edge of the leaf.

It may be preferred that the output axis and an axis of rotation of the transmission element run spaced apart from one another, in particular parallel to one another.

On the one hand, as a result, the output shaft and the transmission element do not rotate about the same axis of rotation and can be arranged in different positions, in particular in a modular manner. On the other hand, the parallel profile reduces energy losses and facilitates assembly.

The closer wheel and the transmission element can be mounted so as to each be rotatable or rotatable together about a common axis of rotation. Furthermore, the closer wheel and the transmission element can each or together be mounted so as to be rotatable on a fixed axle body by means of one or a plurality of pivot bearings, in particular roller bearings or slide bearings, in particular needle bearings or ball bearings. In particular, the transmission element and the closer wheel can be connected to one another in a form-fitting and/or force-fitting and/or materially-bonded manner and in a rotationally-fixed manner or can be formed in one piece.

This design saves space in the axial direction.

In particular, the closer wheel and/or the transmission element can be arranged at least partially, in particular completely, within the closer housing.

It may be preferred that the drive device comprises at least one interface element for forming an operative connection between the motor-gear module and the closer module, in particular that the interface element comprises at least one gear wheel.

In particular, the interface element can be operatively connected, in particular engaged, with the gear and operatively connected to the energy storage device. Torque can be transmitted from the output shaft to the closer module and/or from the closer module to the output shaft by means of the interface element. The interface element can be formed by means of at least one gear element of the gear and/or by means of at least one element of the closer module and/or by an additional element. The interface element can be designed in one piece or in several pieces.

The interface element is operatively connected, in particular engaged, with the gear and operatively connected to the energy storage device.

In particular, the motor-gear housing can comprise a first opening and the closer housing can comprise a second opening. The motor-gear housing and the closer housing can be arranged relative to one another in such manner that the closer module, in particular the energy storage device, and the gear, in particular the output shaft, are in operative connection with one another through the first and the second opening by means of the interface element.

In particular, the walls of the respective housing, which comprise the first and second openings, can be designed in such manner that the motor-gear housing and the closer housing can be mounted flush with one another.

In particular, the interface element can protrude into the motor-gear housing and/or into the closer housing. In particular, the interface element can protrude into the space formed by the respective housing.

In particular, the interface element can have at least one gear wheel.

In particular, the interface element can have a plurality of gear wheels.

In particular, the motor-gear housing can be connected to the closer housing in a form-fitting and/or force-fitting and/or materially-bonded manner. Such a connection can be effected, for example, in particular by means of at least one screw connection and/or one pin connection and/or one press fit and/or T-groove and/or one snap connection.

In particular, the drive device can have a machine housing and/or a gear housing and/or the motor-gear housing. In particular, the electric machine can be arranged at least partially within the machine housing. In particular, the gear can be arranged at least partially within the motor-gear housing.

Alternatively or cumulatively, the machine and/or the gear can be arranged at least partially within the motor-gear housing.

This configuration is advantageous with regard to the modularity of the drive device, i.e. the modules and/or elements that can be separated from one another.

In particular, the machine housing and/or the gear housing can be formed by the motor-gear housing.

In particular, the machine housing and/or the gear housing can have prefabricated mounting points for a form-fitting and/or force-fitting and/or materially-bonded connection to one another. Furthermore, the machine housing and/or the gear housing can be designed in one piece.

In particular, the motor-gear module and/or the closer module can be arranged at least partially, in particular completely, within a superordinate housing. In particular, the machine housing and/or the motor-gear housing can be connected to the superordinate housing in a form-fitting and/or force-fitting and/or materially-bonded manner. In particular, the closer housing can be connected to the superordinate housing in a form-fitting and/or force-fitting and/or materially-bonded manner. In particular, one or a plurality of such connections can be designed in the form of at least one screw connection and/or one pin connection and/or one press fit and/or one T-groove and/or one snap connection. In particular, the motor-gear housing can be connected to the closer housing in a form-fitting and/or force-fitting and/or materially-bonded manner, preferably by means of at least one screw connection and/or one pin connection and/or one press fit and/or one T-groove and/or one snap connection.

In particular, the drive device can have a control module with a control device. In particular, the control module can be arranged at least partially, in particular completely, within the superordinate housing of the drive device.

In particular, the control module can be arranged on the closer module or within the motor-gear housing.

In particular, the control module can comprise a control housing. In particular, the control module can be arranged entirely within the control housing. In particular, the control housing can be connected to the superordinate housing and/or to the motor-gear housing and/or to the closer housing in a form-fitting and/or force-fitting and/or materially-bonded manner. In particular, one or a plurality of such connections can be designed in the form of at least one screw connection and/or one pin connection and/or one press fit and/or one T-groove and/or one snap connection.

In particular, the machine housing and/or the motor-gear housing can have one or a plurality of prefabricated mount points for the form-fitting and/or force-fitting and/or materially-bonded connection with the electric machine and/or the gear and/or the output shaft. In particular, the closer housing can have one or a plurality of prefabricated mount points for the form-fitting and/or force-fitting and/or materially-bonded connection with the closer wheel and/or the transmission element and/or the axle body and/or the linkage carriage.

This configuration is advantageous with regard to a simple and easy-to-assemble design.

It may be preferred that the gear has a transmission ratio as a quotient of the speed of a rotor of the electric machine as a dividend and the speed of the output shaft, with the transmission ratio being less than 125, preferably less than 100, particularly preferably less than 75.

By selecting the transmission ratio of the gear, which is less than 125, preferably less than 100, particularly preferably less than 75, a compact design of the gear is made possible such that the drive device is compact overall, but with a reduction in friction also being achieved. The efficiency of the gear is also significantly increased; since with small transmission ratios, energy losses are reduced.

In a further aspect of the disclosure, a swing leaf arrangement is indicated with a leaf, in particular a door leaf or a window leaf, which can be pivoted between a closed position and an open position. The leaf has a secondary closing edge facing the leaf axis and a main closing edge opposite the secondary closing edge. The leaf can be mounted on the secondary closing edge by means of at least one hinge so as to be rotatable about a leaf axis. The swing leaf arrangement has a drive device as described above. Its electric machine is at least partially, in particular completely, arranged in an installation space between the leaf axis and the output axis.

It may be preferred that the drive device is mounted on the leaf.

Alternatively, the drive device can be mounted on a frame, with the leaf being mounted on the frame by means of the hinge so as to be rotatable. The frame can be designed as part of the leaf arrangement or as a separate component. Furthermore, the drive device can be arranged on a building wall. If the drive device is not arranged on the leaf, a slide rail can be arranged on the leaf, with a lever for connection to the output shaft of the drive device being arranged so as to be slidable in the slide rail.

In particular, the motor-gear housing and the closer housing can each be cuboid. The motor-gear housing and/or the closer housing can be cuboid, i.e. with four adjacent walls, with the adjacent walls being orthogonal to one another. In this way, the drive device can be mounted on both sides.

The drive device can preferably be used in a swing leaf drive.

In a swing leaf drive, a leaf is pivoted from a closed position, in which the leaf rests against a frame, to an open position about the leaf axis by means of the drive device, with the torque being transferred by means of the lever from the output shaft of the drive device to the door or to the frame. The drive device can be mounted on the leaf, and a slide rail can be arranged on the frame, or can be mounted on the frame, and a slide rail can be arranged on the leaf. In addition to the drive device, the swing leaf drive can also comprise the lever and/or the slide rail and/or the leaf. In particular when used on fire protection leaves, the drive device can have a closer module. In the event of a fire, the closer module ensures that the fire protection leaf closes, in particular without manual actuation and without current.

In particular, the drive device, preferably the electric machine and/or the gear and/or the energy storage device, can be designed in such manner that the leaf can be moved without manual force exerted by a person, in particular without a manual torque exerted by a person, on the leaf, in particular in a fully automated manner, by means of the drive device, in particular by means of a machine torque. However, the movement of the leaf can be accelerated by the manual force exerted by the person, in particular the manual torque, on the leaf.

The movement of the leaf here means an opening movement and/or a closing movement of the leaf.

Alternatively, the drive device, preferably the electric machine and/or the gear and/or the energy storage device, can be designed as an auxiliary drive in such manner that the leaf is only moved if at least at one point in time of the movement of the leaf, in particular at a beginning of the movement, in addition to a force generated by the drive device, in particular a machine torque, a manual force exerted by a person, in particular a manual torque exerted by a person, is exerted on the leaf.

BRIEF DESCRIPTION OF THE DRAWINGS

Further details and advantages of the disclosure will be explained below on the basis of the exemplary embodiments shown in the figures. They show.

DETAILED DESCRIPTION OF THE DRAWINGS

The same parts are always provided with the same reference numerals in the different figures, which is why they are generally also only described once.

Figure 1:
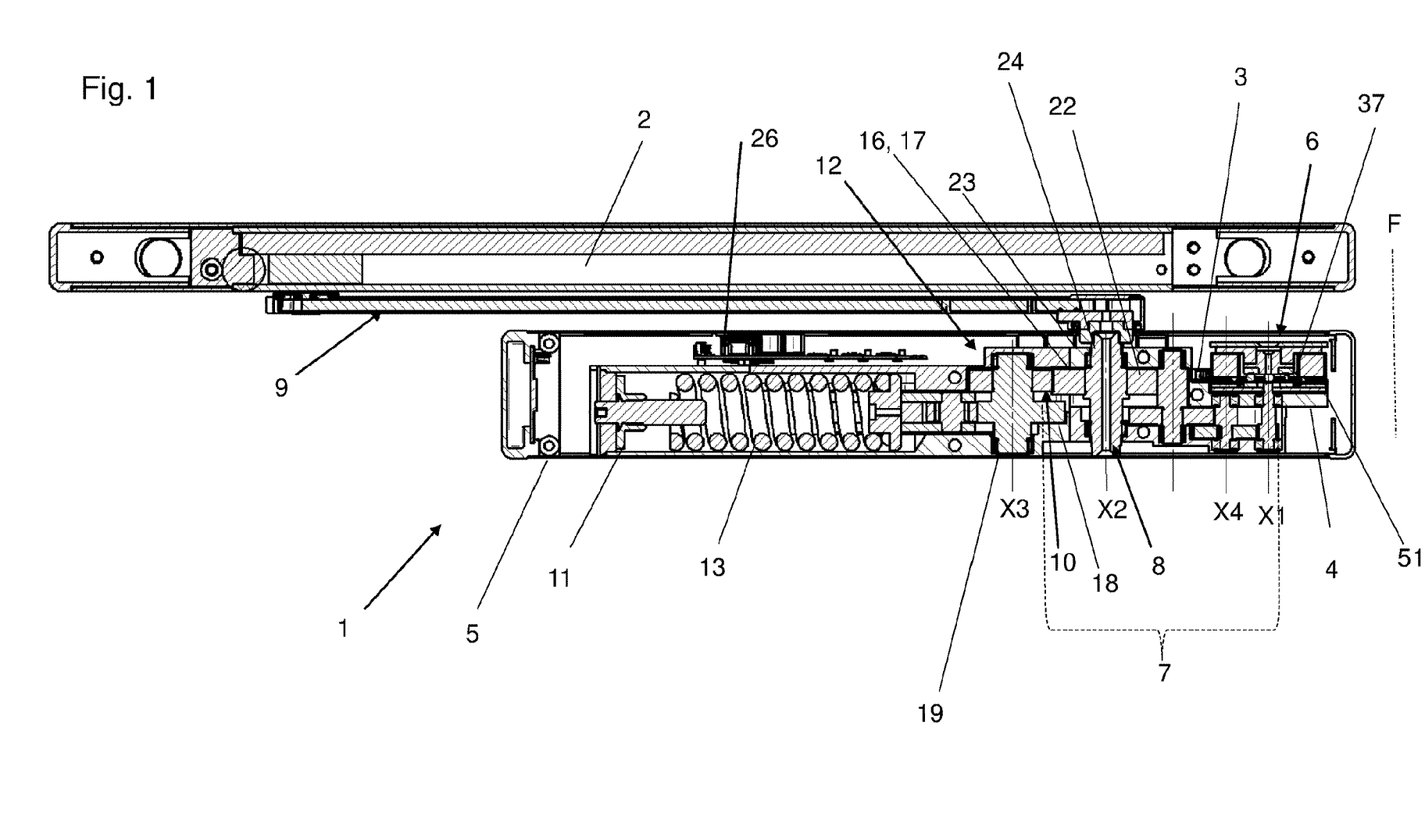
FIG. 1 an exemplary embodiment of a drive device according to the disclosure in a schematic sectional representation.

FIG. 1 shows a drive device 1 for pivoting a leaf 44 about a leaf axis F (FIG. 7a), in particular a door leaf or a window leaf. The drive device 1 has a motor-gear module 3. The motor-gear module 3 has a motor-gear housing 4, an electric machine 6 with a machine axis X1, and a gear 7 with an output shaft 8 mounted so as to be rotatable about an output axis X2 for connection to a lever 9.

The electric machine (6) is at least partially, in particular completely, arranged in an installation space between the leaf axis F and the output axis X2.

The drive device 1 also has a closer module 11 which has a closer housing 12 and a mechanical energy storage device 13.

The drive device 1 has an interface element for forming an operative connection between the motor-gear module 3 and the closer module 11.

The gear 7 has a transmission ratio as a quotient of the speed of the rotor as a dividend and the speed of the output shaft, with the transmission ratio being less than 125, preferably less than 100, particularly preferably less than 75.

The lever 9 is used to form a connection between the drive device 1 and the leaf 44, i.e. with the exemplary door leaf or window leaf or with a frame 48, with the drive device 1 being able to be mounted either on the frame 48 or on the leaf 44. Within the meaning of the disclosure, the term frame 48 also includes a door frame or window frame. In particular, the lever 9 can be designed in such manner that a voltage supply of the electric machine 6 and/or at least one control signal for the electric machine 6 can be transmitted via the lever 9 to the motor-gear module 3, in particular to the electric machine 6 and/or to a control module 26. The lever 9 is guided in a slide rail 2, which in the exemplary embodiment represented in FIGS. 1 and 2, would be mounted on a frame 48, not represented there, but which can be seen in FIG. 7*a*.

Figure 2:
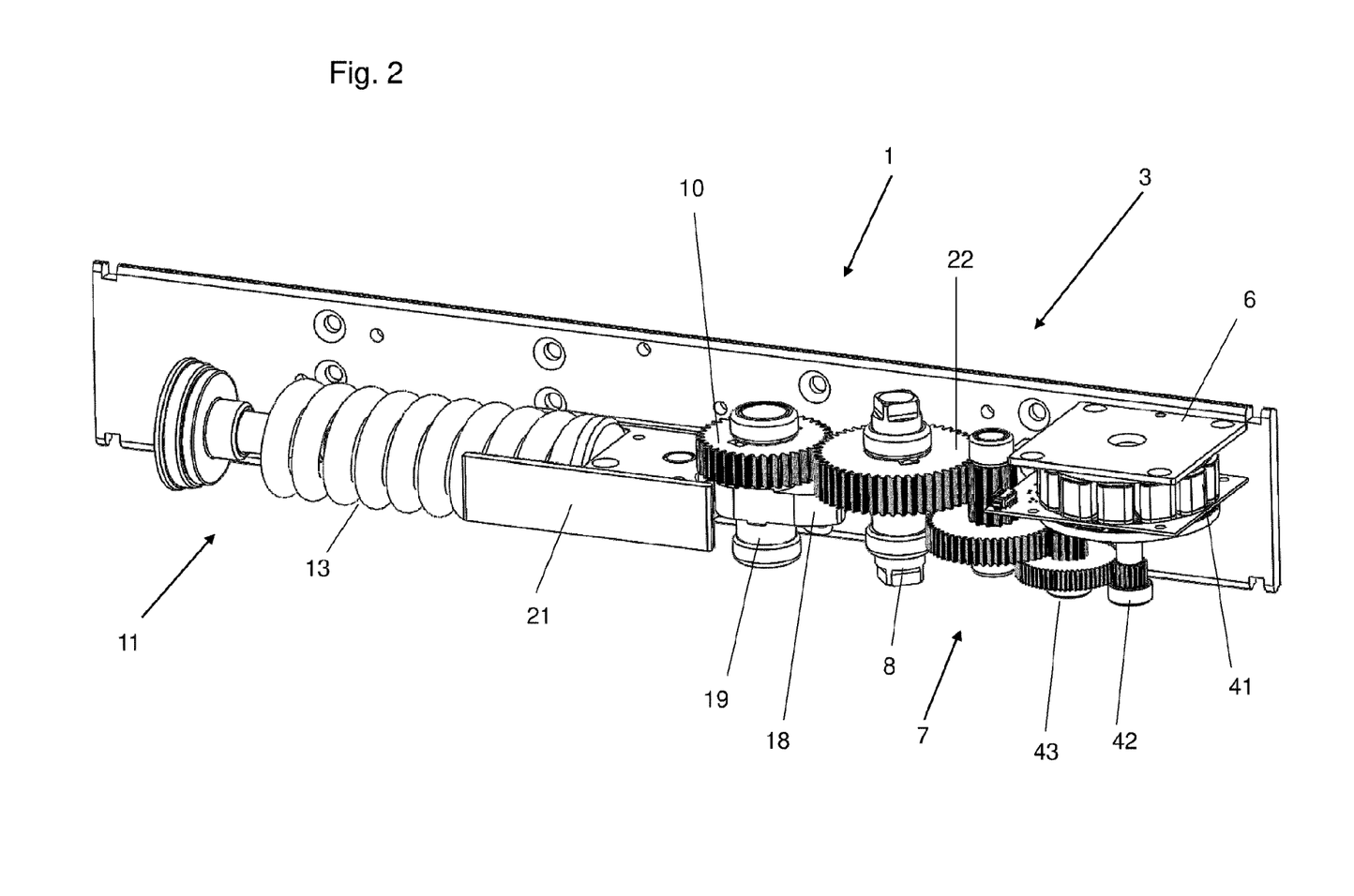
FIG. 2 the drive device from FIG. 1 as a detail in a perspective view.

As can be clearly seen in FIGS. 1 and 2, the gear 7 is arranged in an installation space between the output axis X2 and the machine axis X1.

The motor-gear housing 4 has a first opening 16, with the closer housing 12 having a second opening 17. As can be seen in FIG. 1, the motor-gear housing 4 and the closer housing 12 are arranged in relation to one another in such manner that the closer module 11, in particular the energy storage device 13, and the gear 7, in particular the output shaft 8, are in operative connection with one another through the first opening 16 and the second opening 17 by means of the interface element.

The motor-gear housing 4 has a first side wall 51 facing the leaf axis F and a second side wall facing away from the leaf axis F. A reference numeral for the second side wall is not entered in FIG. 1 for reasons of clarity. However, the second side wall comprises the first opening 16 of the motor-gear housing 4. The electric machine 6 is at least partially, preferably completely, arranged in an installation space between the first side wall 51 and the output axis X2. The leaf axis F can be seen in FIGS. 1 and 2 as well as 4 and 5 and FIGS. 7*a* and 7*b* in the right-hand plane of the drawing.

The motor-gear module 3 and/or the closer module 11 is arranged at least partially, in particular completely, within a superordinate housing 5. The motor-gear housing 4 is connected to the superordinate housing 5 and/or to the closer housing 12 in a form-fitting and/or force-fitting and/or materially-bonded manner. The closer housing 12 is connected to the superordinate housing 5 in a form-fitting and/or force-fitting and/or materially-bonded manner. One or a plurality of such connections are designed, for example, in the form of at least one screw connection.

It can be seen in FIGS. 1 and 2 that the output axis X2 is parallel to the machine axis X1.

The closer module 11 has a transmission element 18 for translating a linear movement of the energy storage device 13 into a rotational movement of the transmission element 18 about an axis of rotation X3 of the transmission element 18. As can be seen by way of example in FIG. 1, the output axis X2 and the axis of rotation X3 of the transmission element 18 are spaced apart from one another and run parallel to one another. The transmission element 18 is designed as a cam disc, specifically as a heart-shaped stroke-producing cam disc, and is rotatably mounted in a rotationally-fixed manner with a closer wheel 10.

For example, the mechanical energy storage device 13 is designed as a compression spring. The compression spring is connected via a linkage carriage 27 to the transmission element 18 for translating the linear movement of the mechanical energy storage device 13 into a rotational movement of the transmission element 18. The linkage carriage 27 has sliding elements 21, which can be seen in FIG. 2. The linkage carriage 27 can be seen in FIG. 4.

The closer wheel 10 is arranged in a coaxial and rotationally-fixed manner in relation to the transmission element 18 for translating the linear movement of the energy storage device 13 into a rotational movement of the transmission element 18.

The gear 7 has an output wheel 22, in particular an output gear wheel, which is coaxial and rotationally-fixed with the output shaft 8, with the output wheel 22 being engaged with the closer wheel 10.

In the exemplary embodiment of FIGS. 1 and 2, the interface element is formed by the output wheel 22.

For example, the motor-gear housing 4 has a first wall 23 with an output opening 24 for the, in particular, rotationally-fixed connection of the output shaft 8 to the lever 9, a second wall adjoining the first wall 23 and a third wall opposite the second wall, with the drive device 1 being designed so as to be fastened both with the second wall and the third wall facing towards the leaf 44, i.e. the exemplary door leaf. The same can apply to the closer housing 12. The motor-gear housing 4, but also the closer housing 12, can each be cuboid in order to enable assembly on both sides.

The control module 26, which has a control device, can also be seen in FIG. 1. The control module 26 is arranged at least partially, in particular completely, within the superordinate housing 5 of the drive device 1.

Figure 3:
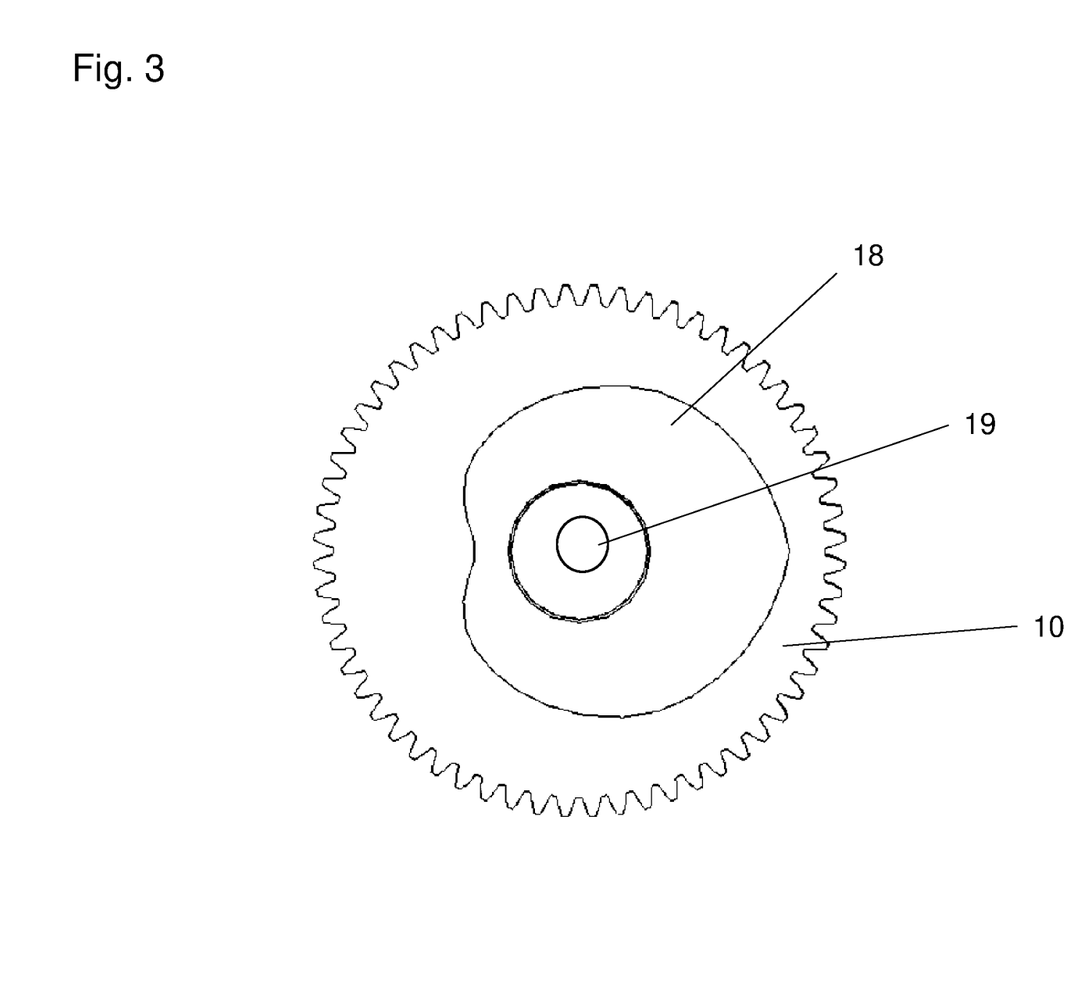
FIG. 3 a transmission element as a detail in a top view.

FIG. 3 shows a special embodiment, with the transmission element 18 being formed as a cam disc, specifically as a heart-shaped stroke-producing cam disc. As can also be seen in FIG. 3, a fixed axle body 19 is arranged, with the transmission element 18 and the closer wheel 10 being rotatably mounted on the axle body 19.

Figure 4:
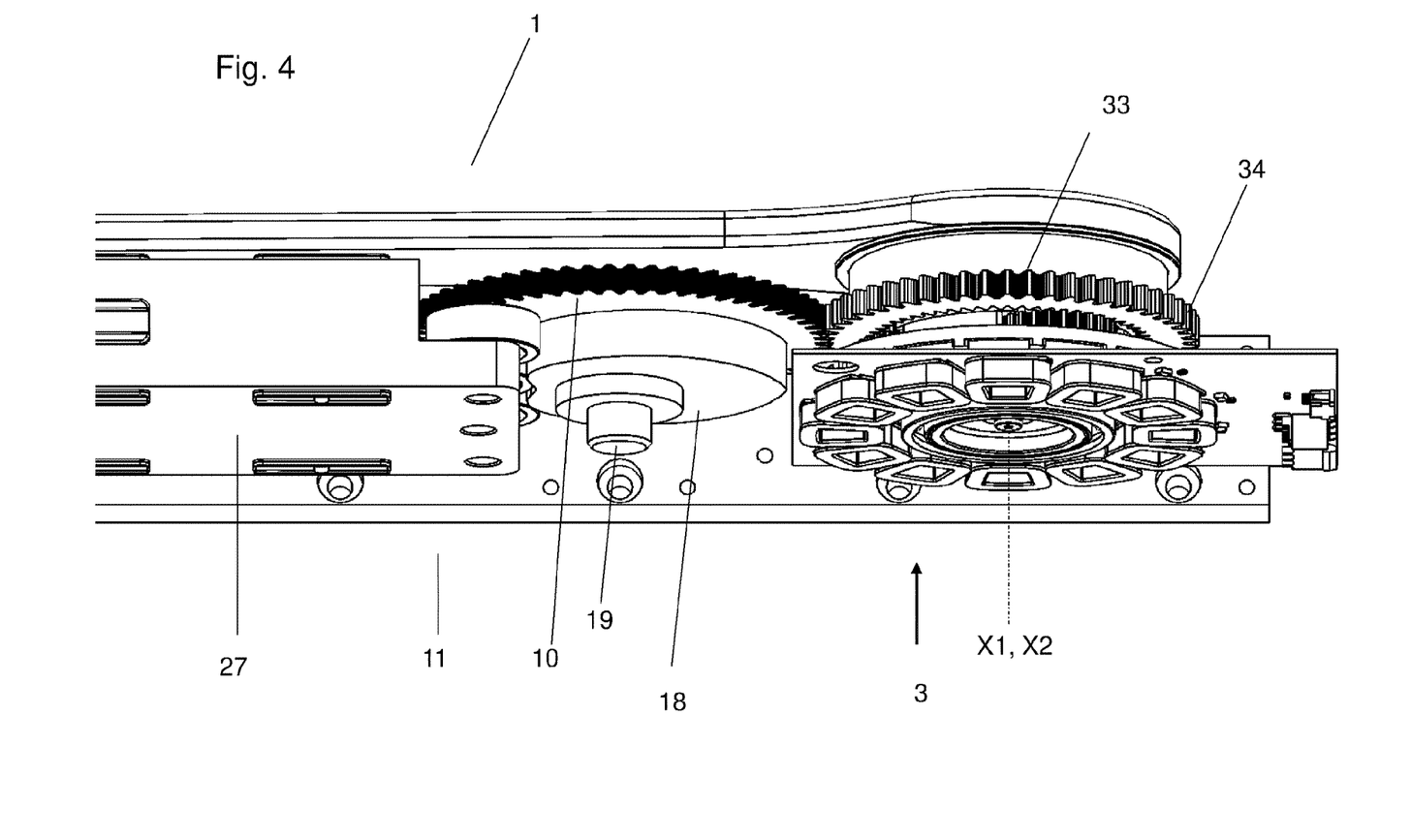
FIG. 4 a further exemplary embodiment of a drive device with a planetary gear, FIG. 5 the drive device from FIG. 4 with the revolving wheel removed, FIG. 6 an axial flux machine in a basic representation in section, FIG. 7a a leaf in a closed position, and FIG. 7b the leaf from FIG. 7a in an open position.
Figure 5:
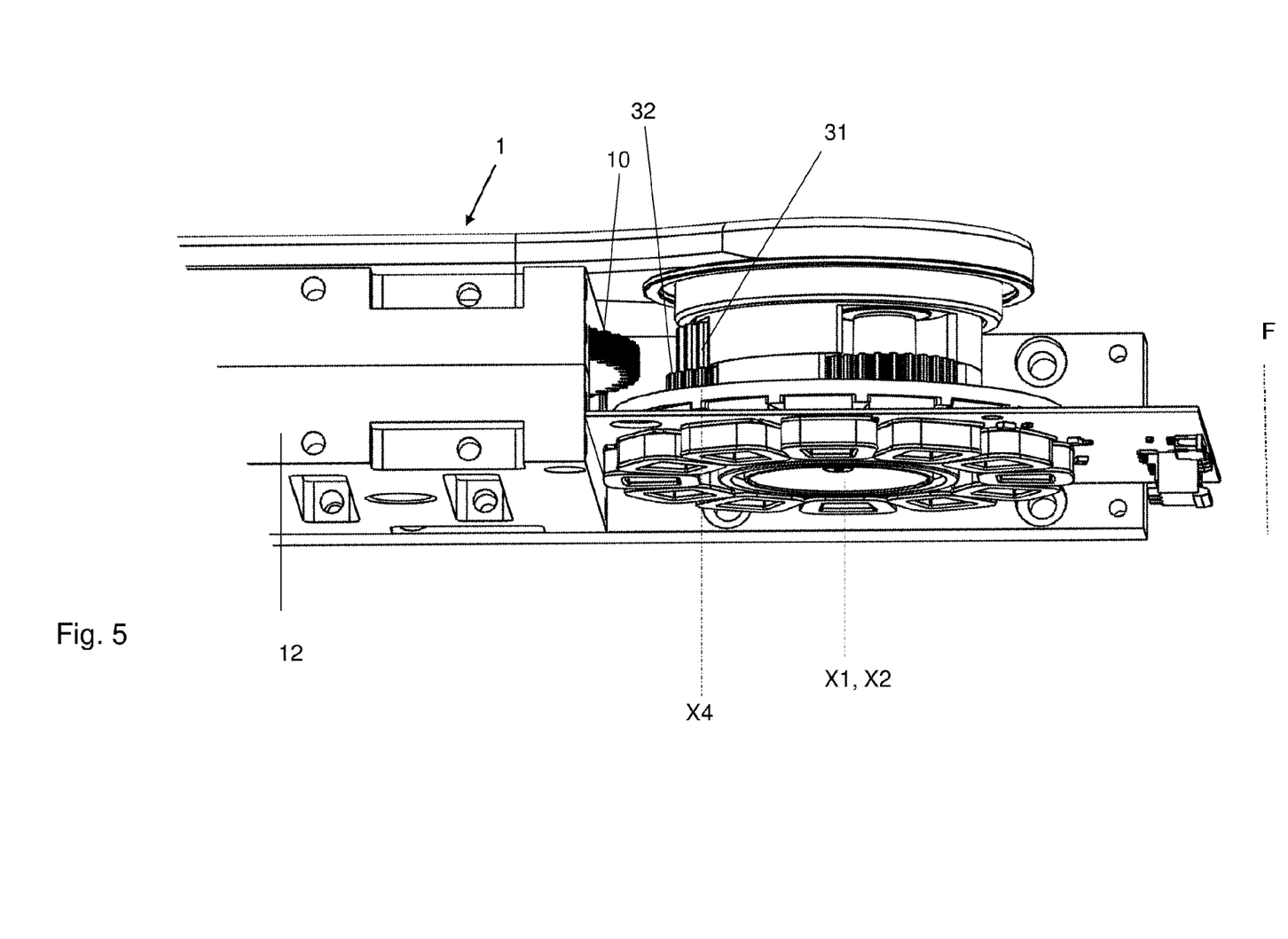

In the FIGS. 4 and 5, the drive device 1 is represented in a further configuration, with the gear 7, in contrast to the exemplary embodiment of FIGS. 1 and 2, being designed as a planetary gear.

As a planetary gear, the gear 7 has a Wolfrom stage. Such a Wolfrom stage has a first gear stage and a second gear stage. The first gear stage comprises a sun gear, a plurality of first planets 32 fastened to a planetary carrier and driven by the sun gear, and a first, stationary ring gear. The sun gear, the planetary carrier and the first stationary ring gear cannot be seen in FIGS. 4 and 5 due to the view selected. The second gear stage comprises a second rotatable ring gear 33, second planets 31 which are rotationally-fixed with the first planets 32. The second planets 31 drive the second ring gear 33. The second ring gear 33 forms the power output of the planetary gear. In FIG. 5, the second ring gear is removed.

The gear 7 according to the exemplary embodiment of FIGS. 4 and 5 is designed as a combination of planetary gear and spur gear. The second ring gear 33 of the planetary gear has external teeth 34 and acts as a spur gear. The second ring gear 33 is engaged with the closer wheel 10 of the closer module 11. In the exemplary embodiment of FIGS. 4 and 5, the closer wheel 10 forms the interface element.

In the exemplary embodiment of FIGS. 4 and 5, the output axis X2 is coaxial with the machine axis X1.

In the exemplary embodiments described, the electric machine 6 is designed as an axial flux machine.

Figure 6:
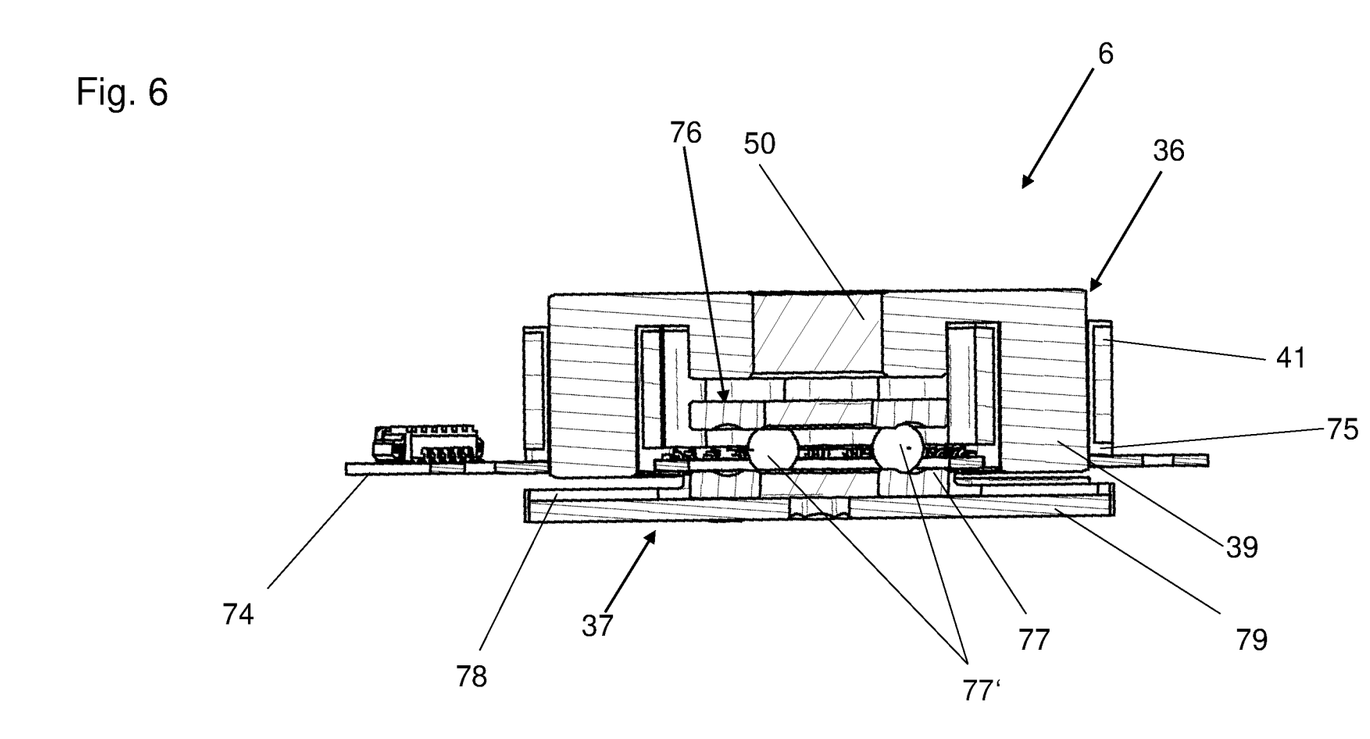

The electric machine 6 is represented in principle as a detail in FIG. 6. The electric machine 6 has a stator 36 and a rotor 37. The stator 36 has a plate-shaped stator base 38 and a plurality of stator teeth 39 protruding from the stator base 38 in the axial direction of the electric machine 6. A coil 41 is arranged around each of the stator teeth 39. Each stator tooth 39 has an electrically insulating tooth cover 75, with the stator 36 having a plurality of coils 41 and each of the coils 41 being wound around the tooth cover 75 and therefore indirectly via the tooth cover 75 around the stator tooth 39. The stator teeth 39 pass through a circuit board 74 on which the coils 41 are contacted.

It can be seen in FIG. 6 that the stator 36 also comprises a stationary bolt 50, with the bolt 50 having a bearing mount 76 for receiving a roller bearing 77. A roller bearing 77 with balls 77' is represented in FIG. 6 as an example. The drive device 1 comprises the roller bearing 77 for the rotatable bearing of the rotor 37 with respect to the stator 36, with the roller bearing 77 being received on the bearing mount 76 of the bolt 50. The rotor 37 is rotatably mounted on the stator 36 by means of the roller bearing 77. In an embodiment that is not represented, a bearing mount can be provided directly on the stator base, on which a roller bearing can be received. The rotor 37 comprises a plurality of permanent magnets 78. Each permanent magnet 78 is formed in a plate shape. The rotor 37 has a rotor plate 79 in the form of a rotor disc. Furthermore, each permanent magnet 78 protrudes from the rotor plate 79 of the rotor 37 in the axial direction of the electric machine, in particular in the direction of the stator 36.

As can best be seen from FIGS. 1 and 2, the gear 7 has a first gear element 42 which can be rotated coaxially with the machine axis X1 and which is connected to the rotor 37 in a rotationally-fixed manner. The gear 7 also has a second gear element 43, which is operatively connected to the first gear element 42, with an axis of rotation X4 of the second gear element 43 running in an installation space between the machine axis X1 and an outer lateral surface of the rotor 37 that is extended virtually in the axial direction of the electric machine 6 or an outer lateral surface of the stator 36 that is extended virtually in the axial direction of the electric machine 6, in particular parallel to the machine axis X1.

In the exemplary embodiment of FIGS. 4 and 5, the first gear element 42 is formed by the sun gear, with the second gear element 43 being formed by the planet 32.

Figure 7A:
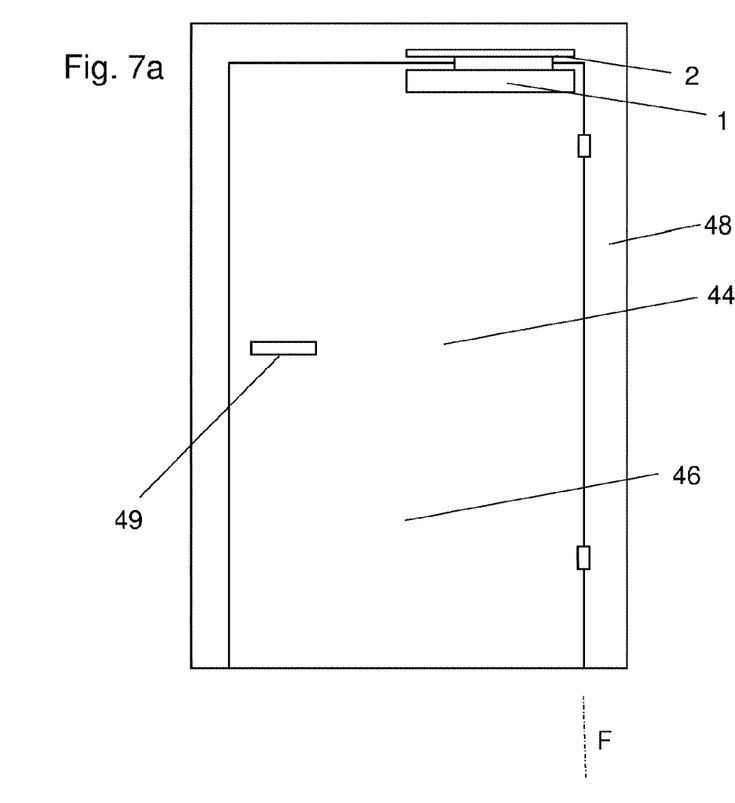
Figure 7B:
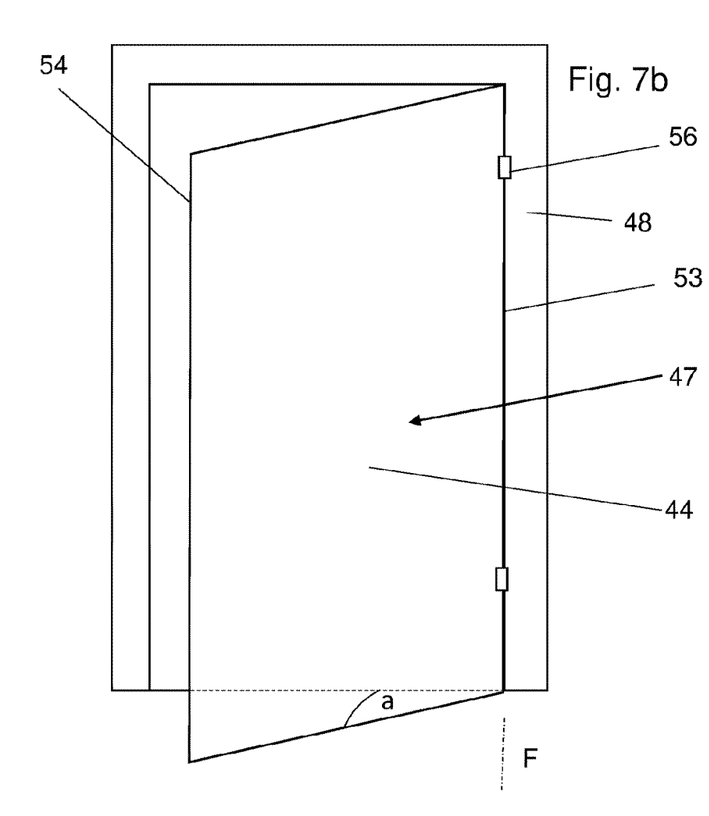

FIGS. 7a and 7b show a swing leaf arrangement 50 with the leaf 44, in particular a door leaf or a window leaf, which can be pivoted between a closed position 46 and an open position 47.

The closed position 46 of the leaf 44 can be seen in FIG. 7a. The open position 47 and an exemplary opening angle α of the leaf 44 can be seen in FIG. 7b. It can also be seen in FIG. 7a that the drive device 1 is mounted on the frame 48 with its slide rail 2. The drive device 1 is mounted on the leaf 44. A door handle 49 on the leaf 44 is also indicated in FIG. 7a. The leaf axis F is represented only schematically in FIGS. 1, 2 and 4 and 5 in order to make it clear that it is arranged in the plane of the drawing to the right of the machine axis X1.

The leaf 44 has a secondary closing edge 53 facing the leaf axis F and a main closing edge 54 opposite the secondary closing edge 53. The leaf 44 can be mounted on the secondary closing edge 53 by means of a hinge 56 so as to be rotatable about the leaf axis F. The swing leaf arrangement 50 can be pivoted with one of the drive devices 1 described above in their various configurations. It can be inferred from FIGS. 7a and 7b in connection with FIG. 1 that the electric machine 6, which is covered by the superordinate housing 5, is at least partially, in particular completely, arranged in an installation space between the leaf axis F and the output axis X2.

The electric machine 6 is therefore closer to the leaf axis F than the output shaft 5 such that in combination with the gear 7 this results in favorable transmission ratios from the electric machine 6 to the output shaft 8. Furthermore, such a drive device can be brought into operative connection with the mechanical energy storage device 13 of the closer module 11 in a simple manner, since, due to the machine position of the electric machine 6, the output shaft 8 faces the main closing edge 54 of the leaf 44. This also results in favorable transmission ratios from a closer module 11 to the output shaft 8 being achieved.

The invention claimed is:

1. A drive device for pivoting a leaf about a leaf axis, in a door leaf or a window leaf, with a motor-gear module, wherein the motor-gear module has an electric machine with a machine axis and a gear with an output shaft which is mounted so as to be rotatable about an output axis, wherein the electric machine is arranged at least partially in an installation space between the leaf axis and the output axis, wherein the drive device has a closer module with a mechanical energy storage device and a transmission element for translating a linear movement of the energy storage device into a rotational movement of the transmission element, wherein the output axis and an axis of rotation of the transmission element run spaced apart from one another, parallel to one another, and the output axis is arranged in an installation space between the machine axis and the axis of rotation of the transmission element, wherein the drive device comprises at least one interface element for forming an operative connection between the motor-gear module and the closer module, in that the interface element comprises at least one gear wheel.

2. The drive device according to claim 1, wherein the gear with the output shaft is arranged at least partially in an installation space between the output axis and the machine axis.

3. The drive device according to claim 1, wherein the motor-gear module has a motor-gear housing with a first side wall facing the leaf axis and a second side wall facing away from the leaf axis, wherein the electric machine is arranged at least partially in an installation space between the first side wall and the output shaft.

4. The drive device according to claim 1, wherein the machine axis and the output axis run parallel.

5. The drive device according to claim 1, wherein the output shaft is connected to a lever in a rotationally-fixed manner to form a connection of the drive device to the leaf or to a frame, wherein the lever is guided in a slide rail and configured whereby a voltage supply of the electric machine and/or at least one control signal for the electric machine is transferred via the lever to the motor-gear module.

6. The drive device according to claim 1, wherein the gear with the output shaft is designed as a toothed gear.

7. The drive device according to claim 1, wherein the electric machine is formed as an axial flux machine with a stator and a rotor.

8. The drive device according to claim 1, wherein the electric machine comprises a stator with a plate-shaped, stator base, and a plurality of stator teeth protruding from the stator base in the axial direction of the machine.

9. The device according to claim 1, wherein the transmission element is designed as a cam disc.

10. The drive device according to claim 1, wherein the gear with the output shaft has a transmission ratio as a quotient of the speed of a rotor of the electric machine as a dividend and the speed of the output shaft, wherein the transmission ratio is less than 125.

11. A swing leaf arrangement with a leaf, a door leaf or a window leaf, which is pivoted between a closed position and an open position, wherein the leaf has a secondary closing edge facing the leaf axis and a main closing edge opposite the secondary closing edge, wherein the leaf is mounted on the secondary closing edge by at least one hinge to be rotatable about the leaf axis, and with a drive device according to claim 1, wherein an electric machine is arranged at least partially in an installation space between the leaf axis and the output axis.

12. The drive device according to claim 1, wherein the at least one gear wheel is coaxially arranged and rotationally-fixed with respect to the transmission element.

13. The drive device according to claim 1, wherein the mechanical energy storage device includes one or a plurality of compression springs or tension springs that are connected to the transmission element via a linkage carriage with a plurality of sliding elements.

* * * * *